United States Patent Office 3,007,546
Patented Nov. 7, 1961

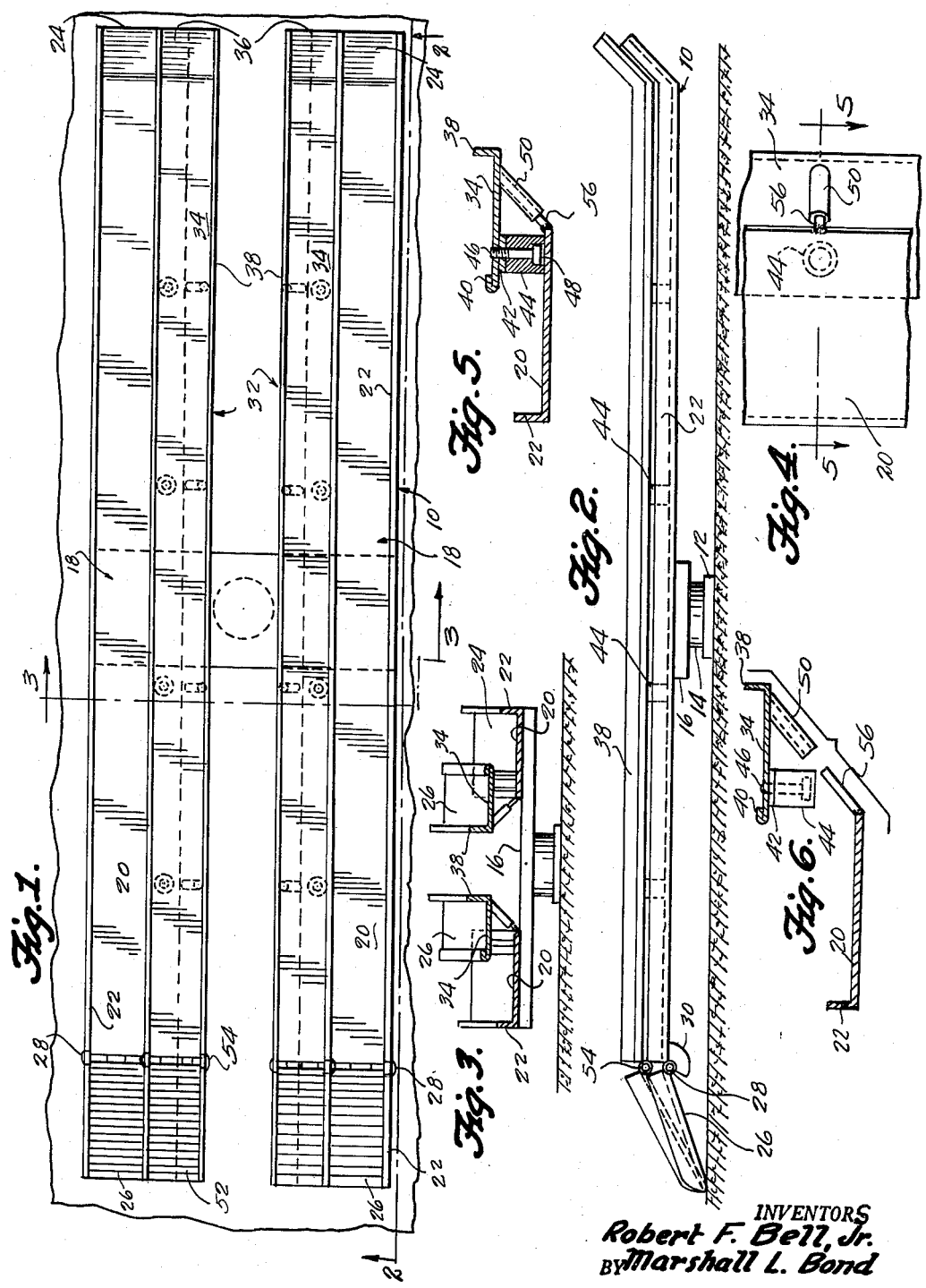

3,007,546
AUXILIARY TRACK DEVICE FOR
AUTOMOBILE LIFTS
Robert F. Bell, Jr., 200 Birch St., and Marshall L. Bond,
3340 La Vista Drive, both of Hapeville, Ga.
Filed Feb. 12, 1960, Ser. No. 8,355
4 Claims. (Cl. 187—8.67)

This invention relates to the general field of automobile lifting devices and, more specifically, the instant invention pertains to an attachment for a conventional hydraulically operated automobile lift.

In view of the demand by the public for smaller cars of domestic or foreign manufacture, much trouble has materialized in the servicing of such automobiles by mechanics when repairs, adjustments, and mechanical failures necessitate servicing of the same. This is due to the fact that for the most part, the smaller cars and the foreign automobiles have a wheel spacing lesser in width than the width of the wheel spacing in the cars of conventional manufacture. Thus, mechanics and automobile service men are unable to use the conventional two track hydraulic lifts found in service stations and garages.

The problem of servicing the smaller cars thus involves two factors, namely, increased expenditures of monies to provide a separate hydraulic lift to accommodate such cars, and the difficulty in finding additional space if a second life were to be installed on the premises.

Consequently, one of the primary objects of this invention is to provide an auxiliary attachment for the conventional hydraulic automobile lift whereby either a conventional or smaller car may be serviced without difficulty.

Another object of this invention is to provide an attachment of the type generally referred to above which may be quickly attached to or detached from the tracks or ramps of the conventional lift.

This invention contemplates, as a still further object thereof, the provision of an auxiliary track device for an automobile lift, the device being non-complex in construction and assembly, inexpensive to manufacture and maintain, and one which is durable in use.

Other and further objects and advantages of the instant invention will become more evident from a consideration of the following specification when read in the light of the annexed drawing, in which:

FIGURE 1 is a top plan view of a conventional automobile lift having connected thereto an auxiliary track device in accordance with this invention;

FIGURE 2 is a side elevational view of the lift and attachment shown in FIGURE 1;

FIGURE 3 is a detail transverse cross-sectional view, FIGURE 3 being taken substantially on the vertical plane of line 3—3 of FIGURE 1, looking in the direction of the arrows;

FIGURE 4 is a fragmentary bottom plan view of a portion of the lift shown in FIGURE 1;

FIGURE 5 is a transverse detail cross-sectional view of the lift, FIGURE 5 being taken substantially on the horizontal plane of line 5—5 of FIGURE 4, looking in the direction of the arrows; and, FIGURE 6 is an exploded cross-sectional view similar to FIGURE 5.

Reference numeral 10 designates, in general, a hydraulically operated automobile lift of conventional design to which the auxiliary track device constructed in accordance with the teachings of the invention is applied. The conventional lift includes a lift cylinder 12 having a vertically reciprocable piston rod 14 to which a lift head plate and frame 16 is fixedly secured. To each end of the lift head plate and frame 16 is secured a conventional track 18, the track 18 being connected thereto intermediate its ends. The track 18 is disposed at substantially right angles relative to the lift head plate and frame 16 and comprises a normally horizontal plate 20 having an integrally formed vertically extending guide flange 22 located along a longitudinally extending marginal edge. As seen in the drawing, the flanges are remotely disposed relative to each other and are substantially parallel. Each track 18 terminates, at one end, in an upwardly inclined stop or abutment section 24 to prevent an automobile moving on the tracks 18 from over-shooting those ends thereof. A ramp 26 is pivotally connected at 28 to each of the other ends, respectively, of the tracks 18, and the downward pivotal movement thereof is limited by conventional stop plates 30 which depend from the plates 20 adjacent the hinged end thereof and which are disposed in the pivotal path of movement of the ramps 26.

The structure described above is conventional in this art and has been but briefly set forth in order to provide a suitable environment for the subject matter of this invention which is addressed to the provision of an auxiliary track device to accommodate vehicles having a tread width smaller than the tread width of conventional automobiles.

The auxiliary track device is denoted by reference numeral 32 and is seen to comprise a pair of elongated substantially rectangular plates 34 each having an upwardly inclined stop or abutment section 36 at one end thereof and a vertically extending guide flange 38 integrally formed therewith and extending along a longitudinal marginal edge thereof. Each of the plates 34, at their respective other longitudinally extending marginal edge, is crimped over to form a reverted flange 40.

At longitudinally spaced intervals, each of the plates 34 is formed with depending internally threaded bosses 42 each of which seat against one end of an elongated substantially solid cylindrical rubber bumper 44, the seating being maintained by means of bolts 46 which extend axially through the bumpers 44 for threaded engagement with the bosses 42. The lower headed ends of the bolts 46 are disposed in countersunk recesses 48. As is seen in the drawing, the bumpers depend from each of the plates 34 adjacent the crimped edges thereof.

A plurality of substantially hollow tubular sleeves 50 also depend from the plates 34 in longitudinally spaced relation. The sleeves 50 are seen to be inclined inwardly towards the bumpers 44 at an acute angle with respect to the plates 34 and one of the ends thereof are rigidly secured to the plates 34 adjacent the flanged edges thereof.

A ramp 52 is hingedly connected at 54 to the other end of each of the plates 34 to provide access thereto.

To each longitudinally extending marginal edge of the plates 34 oppositely disposed with respect to the flanges 22 are secured, in longitudinally spaced relation, a plurality of cylindrical rods 56 which project away therefrom at an obtuse angle with respect thereto. The rods 56 are adapted to telescopically receive thereover the sleeves 50 so that the rubber bumpers 44 engage, at their respective lower ends, the plates 20, and the coaction between the plate 20, bumpers 44, sleeves 50 and rods 56 is such that the plates 34 are supported on the plates 20 in overhanging, vertically spaced relation, and with the flanges 38 thereof disposed in laterally spaced and confronting relation.

With the auxiliary track 32 assembled on the track 18, cars having a tread width less than that of conventional cars may be serviced from the conventional hydraulic lift. When conventional automobiles are to be serviced, it is only necessary to slide the sleeves 50 off the rods 56 to remove the auxiliary track device.

Having described and illustrated one embodiment of this invention in detail, it is to be understood that the same is offered merely by way of example, and that this

What is claimed is:

1. An auxiliary track device for an automobile lift having a first pair of elongated substantially rectangular plates disposed in side-by-side laterally spaced and substantially parallel relation, said first pair of plates having adjacent confronting edges, a plurality of rods fixedly secured to said confronting edges and converging upwardly towards each other at longitudinally spaced intervals, said rods projecting away from said first plates at an obtuse angle relative thereto, a second pair of elongated substantially rectangular plates, each of said plates having depending therefrom at spaced intervals from one longitudinal marginal edge a plurality of hollow tubular sleeves, said sleeves projecting away from their respective associated plate at an acute angle, said sleeves telescoping over said rods to releasably connect each of said second pair of plates, respectively, with one of said first pair of plates with said second pair of plates disposed in vertically spaced substantially parallel relation relative to said first pair of plates in overhanging laterally offset relation relative thereto, and spacer means interposed between the overhung portions of said second pate and its associated first plate.

2. An auxiliary track device for an automobile lift having a first pair of elongated substantially rectangular plates disposed in side-by-side laterally spaced and substantially parallel relation, said first pair of plates having adjacent confronting edges, a plurality of rods fixedly secured to said confronting edges and converging upwardly towards each other at longitudinally spaced intervals, said rods projecting away from said first plates at an obtuse angle relative thereto, a second pair of elongated substantially rectangular plates, each of said second pair of plates having depending therefrom at spaced intervals from one longitudinal marginal edge a plurality of hollow tubular sleeves, said sleeves projecting away from their respective associated plate at an acute angle, said sleeves telescoping over said rods to releasably connect each of said second pair of plates, respectively, with one of said first pair of plates with said second pair of plates disposed in vertically spaced substantially parallel relation relative to said first pair of plates in over-hanging laterally offset relation relative thereto, a plurality of internally threaded bosses depending from each of said second pair of plates in longitudinally spaced relation and adjacent its other longitudinally extending edge, and a resilient rubber bumper fixedly secured to each of said bosses and engaging against the uppermost surfaces of each of said first pair of plates.

3. An auxiliary track device for an automobile lift as defined in claim 2, and each plate of said second pair of plates having a longitudinally extending guide flange adjacent a longitudinally extending marginal edge of said plates and a reverted flange extending longitudinally of the opposed longitudinally extending marginal edge.

4. An auxiliary track device for an automobile lift as defined in claim 3, and each plate of each pair of plates having an upwardly turned abutment section adjacent one of their respective ends, and ramp means pivotally connected to each of said plates adjacent the other of their respective ends.

References Cited in the file of this patent
UNITED STATES PATENTS 2,602,633     Reedy _____ July 8, 1952